United States Patent
Allam et al.

(12)

(10) Patent No.: US 6,534,551 B2
(45) Date of Patent: Mar. 18, 2003

(54) PROCESS AND APPARATUS FOR THE PRODUCTION OF SYNTHESIS GAS

(75) Inventors: Rodney John Allam, Guildford (GB); Rebecca Cotton, New Malden (GB)

(73) Assignee: Air Products and Chemicals, Inc., Allentown, PA (US)

( * ) Notice: Subject to any disclaimer, the term of this patent is extended or adjusted under 35 U.S.C. 154(b) by 0 days.

(21) Appl. No.: 09/965,979

(22) Filed: Sep. 27, 2001

(65) Prior Publication Data

US 2002/0103264 A1 Aug. 1, 2002

(30) Foreign Application Priority Data

Oct. 13, 2000 (GB) .............................. 0025150

(51) Int. Cl.⁷ .......................... C07C 27/00; C07C 1/02; F02C 3/00
(52) U.S. Cl. ..................... 518/700; 518/702; 518/703; 518/704; 252/373; 60/39.01; 60/39.02
(58) Field of Search ................................ 518/702, 703, 518/704, 700; 252/373; 60/39.01, 39.02

(56) References Cited

U.S. PATENT DOCUMENTS 4,132,065 A   1/1979   McGann .................... 60/39.02

FOREIGN PATENT DOCUMENTS

| EP | 0748763 | 12/1996 | ............. C01B/3/36 |
| EP | 0930268 | 7/1999 | ............. C01B/3/36 |
| WO | 0003126 | 1/2000 | ........... F01K/23/10 |
| WO | 0009441 | 2/2000 | ............. C01B/3/00 |

*Primary Examiner*—J. Parsa
(74) *Attorney, Agent, or Firm*—Willard Jones, II (57) ABSTRACT

A process for the production of synthesis gas from a hydrocarbon fuel and steam and/or oxygen gas wherein at least part of any steam requirement is provided by heat exchange against exhaust gas from a gas turbine driving an air separation unit supplying at least part of any oxygen requirement for the synthesis gas production. The process is particularly applicable when the synthesis gas is used to prepare a synfuel by methanol synthesis or a Fischer-Tropsch process.

19 Claims, 1 Drawing Sheet

FIG. 1

PROCESS AND APPARATUS FOR THE PRODUCTION OF SYNTHESIS GAS

TECHNICAL FIELD OF THE INVENTION

The present invention relates to a process and apparatus for the production of synthesis gas, particularly for but not necessarily limited to, use in the production of hydrocarbon oils and waxes using the Fischer-Tropsch ("F-T") process or methanol by catalytic hydrogenation of carbon monoxide.

BACKGROUND OF THE INVENTION

Natural gas may be found in remote locations both on- and offshore. It is generally expensive and impractical to transport natural gas from its source to a distant processing plant. One solution is to convert the gas on-site to a valuable and easily transportable product. In this way, the value of the natural gas may be increased.

Natural gas may be converted to "synthesis gas" which is a mixture of carbon monoxide and hydrogen. Synthesis gas may be converted to a solid or liquid synthetic fuel or "synfuel". The synfuel has less volume per unit mass (i.e. has a greater density) than the natural gas. Accordingly, it is more economical to transport synfuel than a corresponding amount of natural gas.

One disadvantage of the onsite processing of natural gas is that the space available for the processing apparatus is often limited. For example, in situations where the source of natural gas is offshore, a gas rig or a sea vessel is used to support the apparatus for extracting the natural gas. The processing apparatus required to convert natural gas into synfuel must be as compact and as lightweight as possible without sacrificing efficiency, productivity or cost-effectiveness. A further disadvantage is that the remote locations of the processing plants require that the plants are as self-sufficient as possible in the production of power to drive associated apparatus.

Examples of synfuels include high molecular weight hydrocarbon compounds produced using the F-T process and methanol produced by the catalytic hydrogenation of carbon monoxide. Between 50 and 60% of the total cost of an F-T liquid or a methanol plant is in the production of the synthesis gas. Clearly, if the cost effectiveness of the synthesis gas generation process is adversely effected in attempting to overcome these disadvantages, the overall processing costs of synfuel production could be significantly increased.

There are several methods of producing synthesis gas from natural gas. Three such methods are based on the following processes:

Steam methane reforming ("SMR") which needs imported carbon dioxide or the consumption of excess hydrogen to achieve the required 2:1 ratio for the relative proportions of hydrogen and carbon monoxide in the resultant synthesis gas.

Partial oxidation ("POX") of natural gas with pure oxygen which achieves a hydrogen to carbon monoxide ratio in the resultant synthesis gas of from 1.6 to 1.8:1.

Autothermal reforming ("ATR") which consists of a partial oxidation burner followed by a catalyst bed with a feed of natural gas, steam and oxygen to produce the required 2:1 ratio for the relative proportions of hydrogen and carbon monoxide in the resultant synthesis gas.

Each of these three processes produces high temperature synthesis gas (SMR 800 to 900° C., POX 1200 to 1400° C. and ATR 900 to 1100° C.). The excess heat generated in these processes may be used to generate steam which, in turn, can be used in steam turbines to drive air separation systems, air compressors and other equipment. The excess may also be used in part in a secondary gas heated catalytic reformer ("GHR"). For a POX/GHR combination, the synthesis gas is typically produced at 500–600° C.

Carbon dioxide and methane are well known to have "greenhouse gas" properties. It is, therefore, desirable that processes for the production of F-T liquids and methanol have low emission levels of these greenhouse gases and other pollutants, for example, oxides of nitrogen ("$NO_x$").

It is, therefore, desirable that the processing of natural gas to produce F-T liquids or methanol using synthesis gas is as efficient in terms of yield and capital and running costs as possible with minimal emissions and power wastage. In addition, the plant should be compact and lightweight, particularly if located offshore.

Various attempts have been made to develop processes displaying at least some of these desiderata. Attempts to integrate certain steps of the component processes are known to achieve some of these goals. Examples of such attempts are disclosed in WO-A-0003126 (Fjellhaug et al), WO-A-9832817 (Halmo et al) and WO-A-0009441 (Abbott).

U.S. Pat. No. 4,132,065 (McGann; published Jan. 2$^{nd}$, 1979) discloses a continuous partial oxidation gasification process for producing synthesis gas. A hydrocarbonaceous fuel such as natural gas is reacted with a free oxygen containing gas, preferably air, optionally in the presence of a temperature moderator such as steam or water to produce synthesis gas. A portion of the synthesis gas is combusted in the presence of compressed air to produce a combustion product gas which is expanded in a gas turbine. Free oxygen containing gas is provided by a compressor that is driven by at least a portion of the power generated by the expansion of the combustion product gas in the gas turbine.

It is the primary objective of this invention to improve the efficiency and lower the capital and operation costs of a synthesis gas generation process. A further objective of the invention is to reduce greenhouse gas emissions from such a process. The process is to have particular application in the production of synfuels.

SUMMARY OF THE INVENTION

It has been found that, by integrating a synthesis gas generation process with a gas turbine producing power, at least a portion of which may be used to drive a cryogenic air separation unit ("ASU"), process efficiency can be increased and process cost reduced. In addition, greenhouse gas emissions can be reduced and the plant can be made more compact and lightweight. Further, there is an improvement in the level of self-sufficiency in respect of power generation.

Hydrocarbon fuel gas is reacted with steam and/or oxygen gas in a synthesis gas generation system to produce a synthesis gas product stream. An oxidant gas is compressed to produce a compressed oxidant gas, at least a portion of which is combusted in the presence of combustion fuel gas to produce combustion product gas. The combustion product gas is expanded to produce power and expanded combustion product gas. Heat from the expanded combustion product gas is recovered by using the expanded combustion product gas to heat steam by heat exchange to produce heated steam, at least a portion of which is used to provide at least a portion of any steam requirement for producing the synthesis gas product stream in the synthesis gas generation system.

Additionally or alternatively, at least a portion of the oxygen gas is provided using an ASU that is driven by at least a portion of the power generated by the expansion of the combustion product gas.

DETAILED DESCRIPTION OF THE INVENTION

According to a first aspect of the present invention, there is provided a process for the production of synthesis gas, said process comprising:

reacting hydrocarbon fuel gas with steam and/or oxygen gas in a synthesis gas generation system to produce a synthesis gas product stream;

compressing an oxidant gas to produce a compressed oxidant gas;

combusting combustion fuel gas in the presence of at least a portion of said compressed oxidant gas to produce combustion product gas;

expanding said combustion product gas to produce power and expanded combustion product gas;

heating a first steam stream by heat exchange against a stream of said expanded combustion product gas to produce a heated first steam stream and using at least a portion of said heated first steam stream to provide at least a portion of the steam for producing the synthesis gas product stream in the synthesis gas generation system; and/or providing at least a portion of the oxygen gas using an ASU that is driven by at least a portion of the power generated by the expansion of the combustion product gas.

Whilst the steps of compressing an oxidant gas, combusting combustion fuel gas in the presence of compressed oxidant gas and expanding the resultant combustion product gas can be carried out in dedicated stand alone units, it is preferred that these steps are carried out in a gas turbine system.

The synthesis gas generation system may comprise a POX, an ATR or a catalytic ATR. However, using these reactors alone may result undesirably in a significant amount of waste heat. Therefore, in preferred embodiments, the synthesis gas generation system comprises a GHR and the process comprises reforming hydrocarbon fuel gas with steam to produce synthesis gas.

The synthesis gas generation system may comprise a POX and GHR in combination. In these preferred embodiments, the process comprises:

partially oxidizing hydrocarbon fuel gas in the presence of oxygen gas in the POX to produce a first intermediate synthesis gas stream; and reforming hydrocarbon fuel gas with steam in the GHR to produce a second intermediate synthesis gas stream and combining said intermediate synthesis gas streams to produce the synthesis gas product stream.

In these embodiments, the POX/GHR system may generate synthesis gas using steam from a gas turbine waste heat recovery and steam generation system ("HRSG"). The steam from the HRSG provides for the deficiency in heat input to the POX/GHR system. At least a portion of the power generated by the gas turbine is used, either directly or indirectly, to provide the power requirement of the ASU.

The oxidant gas may be selected from oxygen or air. In some embodiments, the oxidant gas is oxygen provided by an ASU although, in preferred embodiments, the oxidant gas is air.

Preferably, the process further comprises:

heating water by heat exchange against the expanded combustion product gas stream to produce a heated second steam stream;

heating an oxygen gas stream by heat exchange against the heated second steam stream to produce a heated oxygen gas stream; and using said heated oxygen gas stream to provide at least a portion of the oxygen gas in the synthesis gas generation system.

The water to be heated to provide the heated second steam stream may be a liquid water stream, a two-phase (liquid-vapor) stream or a steam stream. In preferred processes, the heated second steam stream is a portion of the heated first steam stream.

The HRSG may produce excess steam. Introduction of this excess steam into the combustion of the combustion fuel gas conditions the fuel gas which has the effect of increasing the power output of the gas turbine. The process may, therefore, further comprise:

heating water by heat exchange against the expanded combustion product gas stream to produce a heated third steam stream; and introducing the heated third steam stream into the combustion of the combustion fuel gas.

The water to be heated to provide the heated third steam stream may be a liquid water stream, a two-phase (liquid-vapor) stream or a steam stream. In preferred embodiments, the heated third steam stream is an excess portion of the heated first steam stream. The introduction of the excess steam in this way further integrates the overall process.

An efficient process is one that is balanced, that is to say, a process in which there is no heat or material loss. In the present invention, the excess portion of the heated first steam stream is surprisingly low, i.e. about 3-wt %. The low level of excess steam was unexpected and indicates that the process is substantially balanced. This is a significant advantage over the known processes.

In preferred embodiments, the hydrocarbon fuel gas comprises methane, natural gas, gas associated with oil production or combustible off-gases from downstream processes and the combustion fuel gas comprises hydrogen, methane, natural gas, gas associated with oil production or combustible off-gases from downstream processes. The use of natural gas as the hydrocarbon fuel gas and the combustion fuel gas is particularly preferred. The natural gas should be desulphurized if it is to come in contact with a solid catalyst.

In preferred embodiments, the combustion fuel gas comprises substantially pure hydrogen produced from the synthesis gas product stream. The use of hydrogen gas as the sole combustion fuel gas in this way virtually eliminates all carbon dioxide emissions from the process. This is a further significant advantage of the present invention over the prior art.

$NO_x$ may be produced during the combustion of the combustion fuel gas. If released into the atmosphere, $NO_x$ would act as a pollutant. The level of $NO_x$ emissions is reduced as the proportion of nitrogen present in the combustion is increased. In addition, the combustion fuel gas may be conditioned by introducing compressed nitrogen into the combustion. This has the effect of increasing the power output of the gas turbine due to the increase in mass of the exhaust gases. Therefore, the process may further comprise:

heating a compressed nitrogen stream by heat exchange against the expanded combustion product gas stream to provide a heated compressed nitrogen stream; and introducing said heated compressed nitrogen stream into the combustion of the combustion fuel gas.

Preferably, the compressed nitrogen stream is produced by compressing a stream of nitrogen produced in an ASU. This step further integrates the overall process.

In preferred embodiments, the expansion of the combustion product gas will produce more power than required to drive the ASU. Instead of allowing a remaining portion of the power generated to be wasted, at least a part of the remaining portion of the power generated may be used to provide auxiliary power for downstream processes.

Once the synthesis gas product stream has been produced, it may be used in a number of ways. In preferred embodiments of the present process, the synthesis gas product stream or a stream derived therefrom is processed in a synfuel generation system to produce a synfuel.

Preferably, the synfuel generation system comprises an F-T reactor and the synfuel is a mixture of high molecular weight hydrocarbon compounds.

The F-T reaction is a catalyzed reaction between carbon monoxide and o hydrogen to produce a mixture of high and low molecular weight hydrocarbon compounds, carbon dioxide and water. The expression "high molecular weight hydrocarbon compounds" includes hydrocarbon compounds having at least 6 carbon atoms that are readily condensable to form oils or waxes. The expression "low molecular weight hydrocarbon compounds" includes gaseous $C_1$–$C_5$ hydrocarbon compounds that are not so readily condensable as the high molecular weight hydrocarbon compounds. At least portion of combustible off-gases generated in the F-T reactor comprising, for example, these low molecular weight hydrocarbons may be introduced as fuel into the combustion of the combustion fuel gas. Alternatively, a stream of at least a portion of the combustible off-gases generated in the F-T reactor or a stream derived therefrom may be combined with hydrocarbon fuel gas to produce a combined gas stream. The combined gas stream or a stream derived therefrom may be fed as fuel to the synthesis gas generation system.

The F-T reaction is highly exothermic and may be expressed by the following reaction scheme:

The overall efficiency of the process is improved by preheating the feed streams to the gas turbine and the synthesis gas generation system by heat exchange against either the expanded combustion product gas stream or the synthesis gas product stream in the usual way.

Methanol may be produced by the catalytic exothermic hydrogenation of carbon monoxide according to the following reaction scheme:

To produce methanol, the synfuel generation system may comprise a reactor provided with a carbon monoxide hydrogenation catalyst. The synthesis gas product stream (or a stream derived therefrom) may, therefore, be reacted in a reactor provided with a hydrogenation catalyst to produce heat and a methanol product stream. Hydrogen, nitrogen and argon may be vented from the reactor.

The methanol product stream may comprise unreacted synthesis gas in which case the process may further comprise recycling the methanol product stream around the reactor until substantially all of the unreacted synthesis gas has been reacted.

In order to reduce emissions, originating from the methanol generation reactor, into the atmosphere, the process may further comprise:

removing a purge gas stream comprising unreacted synthesis and inert gas from the reactor; and introducing at least a portion of said purge gas stream or a stream derived therefrom as fuel into the combustion of the combustion fuel gas.

At least a portion of the purge gas stream may be recycled by feeding to the synthesis gas generation system.

In any one of the methanol production processes, heat may be removed from the methanol generation reactor by heat exchange with water, preferably to form medium pressure steam.

According to a second aspect of the present invention, there is provided apparatus for the production of synthesis gas according to the process of the first aspect of the present invention, said apparatus comprising:

a synthesis gas generation system for reacting hydrocarbon fuel gas with steam and/or oxygen gas to produce a synthesis gas product stream;

compressing means for compressing an oxidant gas to produce compressed oxidant gas;

combusting means for combusting combustion fuel gas in the presence of at least a portion of said compressed oxidant gas to produce combustion product gas;

expanding means for expanding said combustion product gas to produce power and expanded combustion product gas;

heat exchange means for heating a first steam stream against a stream of expanded combustion product gas to produce a heated first steam stream;

conduit means for supplying the stream of expanded combustion product gas from the expanding means to the first heat exchange means;

conduit means for supplying at least a portion of the heated first steam stream from the first heat exchange means to the synthesis gas generation system; and/or an ASU;

means for transferring at least a portion of the power produced by the expanding means to the ASU; and conduit means for supplying at least a portion of the oxygen gas from the ASU to the synthesis gas generation system.

Preferably, the apparatus is adapted to carry out any combination of the optional features of the process described above. In particularly preferred embodiments, the compressing means, the combusting means and the expanding means are stages of a gas turbine.

EXAMPLE

Figure 1:
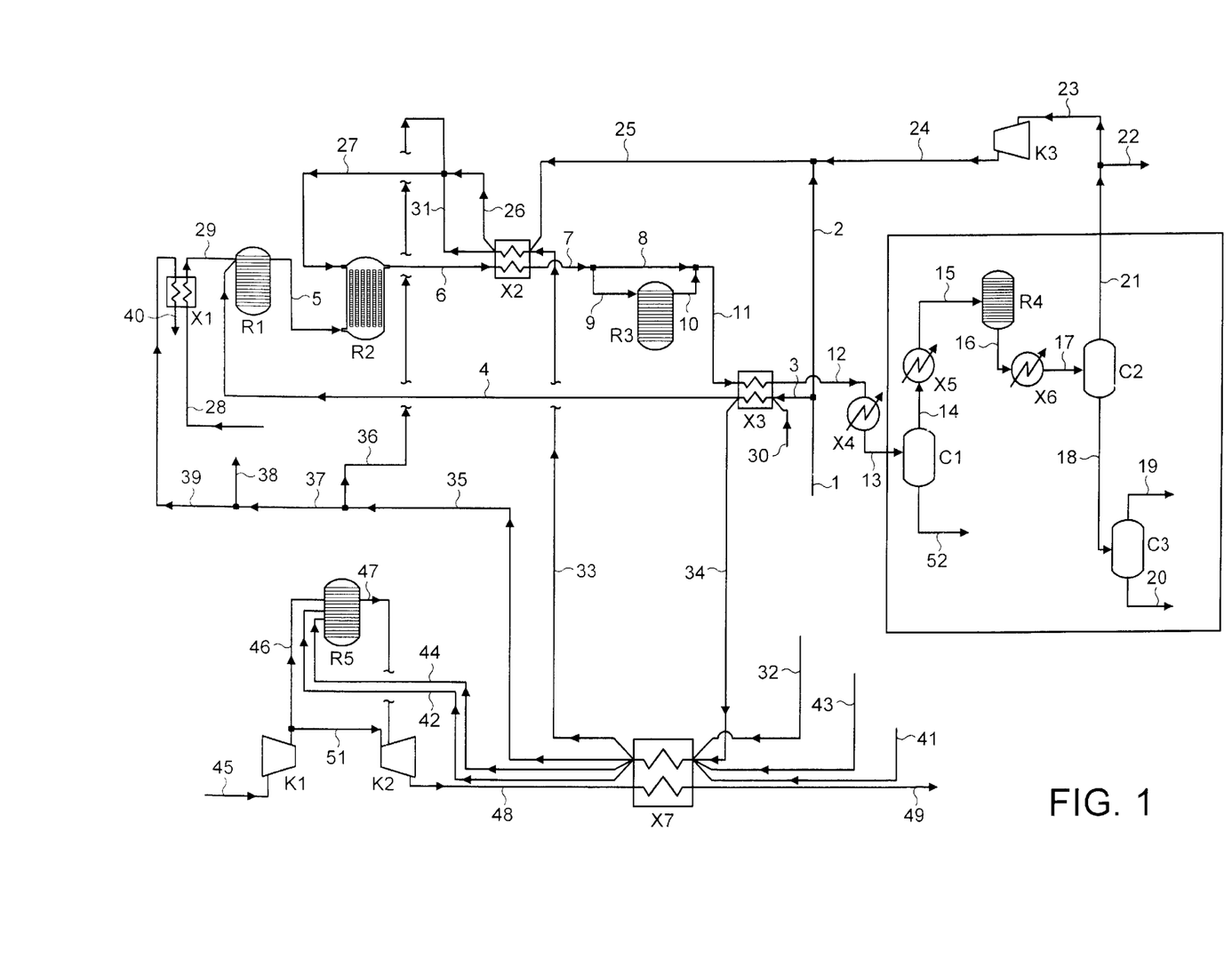
FIG. 1 is a flowsheet describing one embodiment of the process of the present invention in combination with an F-T process to produce hydrocarbon oils and/or waxes.

The detailed configuration of the process depicted in FIG. 1 depends on the downstream gas to liquids process and, in particular, the ratio of hydrogen to carbon monoxide, the amount of carbon dioxide that can be tolerated and the amount and composition of the by-products generated.

Referring to the FIG. 1, a natural gas stream 1, pressurized to about 34 atm. (3.4 MPa), is divided into a first portion 2 and a second portion 3. The first portion 2 is heated to about 300° C. by heat exchange against a hydrogen-enriched synthesis gas product stream 11 in a first heat exchanger X3 and is then fed to the POX R1 where it is reacted with oxygen. The second portion 3 is combined with a compressed uncondensed by-product stream 24 and fed to the GHR.

A stream 28 of oxygen is heated to about 270° C. in a second heat exchanger X1 against a stream of steam 39, pressurized to about 34 atm. (3.4 MPa) to produce a heated oxygen stream 29 and a cooled steam stream 40. The heated oxygen stream 29 is fed to the POX R1 and reacted with natural gas to produce a first intermediate synthesis gas. A stream 5 of the first intermediate synthesis gas leaves the POX at about 1305° C. and enters the shell-side of the GHR R2 where it is mixed with reformed gas exiting the open-ended reformer tubes. The gaseous mixture flows up the side of the tubes, providing heat for the reforming being carried out in the tubes, and exits the GHR as a synthesis gas product stream 6.

The synthesis gas product stream 6 leaves the GHR at about 500° C. and is cooled in a third heat exchanger X2 against, inter alia, a portion 33 of the steam, pressurized to about 35 atm. (3.5 MPa), required to produce the desired steam to carbon ratio of about 4:1 in the GHR. This step produces a cooled synthesis gas product stream 7.

The ratio of hydrogen to carbon monoxide in the synthesis gas product stream 6 is about 1.65:1. However, this ratio may not be appropriate for certain downstream processes. For the present embodiment where the synthesis gas generated is to be used in an F-T process, a higher ratio of between 1.9 to 2.3:1 is required. In this embodiment, the cooled synthesis gas product stream 7 is divided into a first portion 8 and a second portion 9. The second portion 9 is fed to a high temperature shift reactor ("HTS") R3 to shift some of the carbon monoxide to hydrogen. The resultant intermediate hydrogen-enriched synthesis gas stream 10 is combined with the first portion 8 that bypassed the HTS to produce the hydrogen-enriched synthesis gas stream 11 with the required ratio of hydrogen and carbon monoxide.

The hydrogen-enriched synthesis gas stream 11 is then cooled in the first heat exchanger X3 against the vaporisation of a water stream 30, pressurized to 35 atm. (3.5 MPa) and the heating of the natural gas stream 3. This exchange of heat produces the heated natural gas stream 4 and a first steam stream 34 and a cooled hydrogen-enriched synthesis gas product stream 12.

The first steam stream 34 is further heated to about 430° C. in a fourth heat exchanger X7 located in the HRSG to produce a heated first steam stream 35. A first portion 36 of this stream is combined with the gas to be reformed in the GHR and a part 39 of a second portion 37 of this stream is used to pre-heat the oxygen stream 28 in the second heat exchanger X1. An excess part 38, amounting to approximately 3% by weight of the heated first steam stream 35, may be added to a combustor R5.

The cooled hydrogen-enriched synthesis gas product stream 12 is further cooled in a first condenser X4, thereby condensing steam contaminants in the synthesis gas and producing a wet synthesis gas stream 13. Water is separated from the synthesis gas stream in a separator vessel C1 to produce a first water by-product stream 51 and a water-depleted synthesis gas stream 14. The water-depleted synthesis gas stream 14 is then heated to a reaction temperature of about 240° C. in heat exchanger X5 and is fed as stream 15 to the F-T reactor R4 to produce a first hydrocarbon product stream 16.

A very simplified F-T reactor is shown in the flowsheet. The actual unit would be far more complex with more than one reactor, unreacted feed recycle and downstream processing to produce the different cuts of fuel required. For this embodiment of the invention, the first hydrocarbon product stream produced contains about 64% by weight carbon dioxide. This is based on an F-T reactor system which operates at 28 atm. (2.8 MPa) and converts about 92% of the inlet carbon monoxide to hydrocarbon compounds using a cobalt-based catalyst.

High molecular weight hydrocarbon compounds and steam contaminants in first hydrocarbon product stream 16 are condensed in a third condenser X6. The condensed components in stream 17 are removed from the gaseous by-products in a second separator C2 to produce a wet condensed hydrocarbon product stream 18 and an uncondensed by-product stream 21. The water is removed from the wet condensed hydrocarbon product stream 18 in a third separator C3 to produce a second water by-product stream 20 and a second hydrocarbon product stream 19 containing the high molecular weight hydrocarbon products.

A portion 22 of the uncondensed by-product stream 21 is vented to prevent the build up of inert gases such as nitrogen and argon. This portion can be added to the combustion fuel gas for the gas turbine combustor R5. The remaining portion 23 is compressed in a compressor K3 to about 32 atm. (3.2 MPa) and combined with natural gas 2 and the combined stream 25 is heated to about 430° C. in the third heat exchanger X2 to produce a heated steam stream 26 that is combined with steam to produce the GHR feed stream 27.

The remaining part of the flowsheet concerns the gas turbine and the HRSG. A feed air stream 45 is compressed in a second compressor K1 to about 12 atm. (1.2 MPa) and is then fed to the combustor R5 where it is used to combust natural gas. A stream 47 of combustion product gas is expanded in an expander K2 to produce an expanded combustion product gas stream 48. The waste heat in the expanded gas stream 48 is recovered in the HRSG against feed streams to the combustor and the POX/GHR system.

A natural gas stream 41 is heated in the HRSG to produce a heated natural gas stream 42 that is fed to the combustor R5. A nitrogen stream 43 is heated in the HRSG and the resultant heated nitrogen stream 44 used to condition the heated natural gas stream 42 in the combustor R5. A second feed water stream 32 is heated in the HRSG to produce the heated water stream 33 that is fed to the third heat exchanger X2 where it is vaporized to produce a second steam stream that is added to the GHR as feed stream 27.

The power generated by the gas turbine under iso-conditions is 93 MW which is enough to provide the power for the ASU (57 MW) and a large part of the power required for the downstream processes.

The heat and material balance for the exemplified process is provided in the following Table 1:

TABLE 1

Heat and Material Balance for FT production example under iso-conditions

| Mole Fraction | 1 | 2 | 3 | 4 | 5 | 6 | 7 | 8 | 9 | 10 | 11 | 12 | 13 | 14 |
|---|---|---|---|---|---|---|---|---|---|---|---|---|---|---|
| Oxygen | 0.00% | 0.00% | 0.00% | 0.00% | 0.00% | 0.00% | 0.00% | 0.00% | 0.00% | 0.00% | 0.00% | 0.00% | 0.00% | 0.00% |
| Methane | 86.08% | 86.08% | 86.08% | 86.08% | 0.24% | 0.39% | 0.39% | 0.39% | 0.39% | 0.39% | 0.39% | 0.39% | 0.39% | 0.49% |
| Carbon monoxide | 0.00% | 0.00% | 0.00% | 0.00% | 33.83% | 23.45% | 23.45% | 23.45% | 23.45% | 11.46% | 19.47% | 19.47% | 19.47% | 24.68% |
| Hydrogen | 0.00% | 0.00% | 0.00% | 0.00% | 57.15% | 37.70% | 37.70% | 37.70% | 37.70% | 49.69% | 41.67% | 41.67% | 41.67% | 52.83% |
| Carbon Dioxide | 1.61% | 1.61% | 1.61% | 1.61% | 1.38% | 11.96% | 11.96% | 11.96% | 11.96% | 23.94% | 15.93% | 15.93% | 15.93% | 20.13% |
| Water | 0.00% | 0.00% | 0.00% | 0.00% | 7.13% | 25.25% | 25.25% | 25.25% | 25.25% | 13.26% | 21.28% | 21.28% | 21.28% | 0.27% |
| Argon | 0.00% | 0.00% | 0.00% | 0.00% | 0.00% | 0.00% | 0.00% | 0.00% | 0.00% | 0.00% | 0.00% | 0.00% | 0.00% | 0.00% |
| FT Liquid | 8.02% | 8.02% | 8.02% | 8.02% | 0.00% | 0.00% | 0.00% | 0.00% | 0.00% | 0.00% | 0.00% | 0.00% | 0.00% | 0.00% |
| Ethane | 2.66% | 2.66% | 2.66% | 2.66% | 0.00% | 0.00% | 0.00% | 0.00% | 0.00% | 0.00% | 0.00% | 0.00% | 0.00% | 0.00% |
| Propane | 0.57% | 0.57% | 0.57% | 0.57% | 0.00% | 0.00% | 0.00% | 0.00% | 0.00% | 0.00% | 0.00% | 0.00% | 0.00% | 0.00% |
| Butane | 0.09% | 0.09% | 0.09% | 0.09% | 0.00% | 0.00% | 0.00% | 0.00% | 0.00% | 0.00% | 0.00% | 0.00% | 0.00% | 0.00% |
| Pentane | 0.29% | 0.29% | 0.29% | 0.29% | 0.00% | 0.00% | 0.00% | 0.00% | 0.00% | 0.00% | 0.00% | 0.00% | 0.00% | 0.00% |
| Isobutane | 0.10% | 0.10% | 0.10% | 0.10% | 0.00% | 0.00% | 0.00% | 0.00% | 0.00% | 0.00% | 0.00% | 0.00% | 0.00% | 0.00% |
| 2-Methyl-Butane | 0.05% | 0.05% | 0.05% | 0.05% | 0.00% | 0.00% | 0.00% | 0.00% | 0.00% | 0.00% | 0.00% | 0.00% | 0.00% | 0.00% |
| Hexane | 0.01% | 0.01% | 0.01% | 0.01% | 0.00% | 0.00% | 0.00% | 0.00% | 0.00% | 0.00% | 0.00% | 0.00% | 0.00% | 0.00% |
| Heptane | 0.52% | 0.52% | 0.52% | 0.52% | 0.27% | 0.00% | 0.00% | 0.00% | 0.00% | 0.00% | 0.00% | 0.00% | 0.00% | 0.00% |
| Nitrogen | 1.60% | 1.60% | 1.60% | 1.60% | 0.00% | 1.26% | 1.26% | 1.26% | 1.26% | 1.26% | 1.26% | 1.26% | 1.26% | 1.60% |
| Total Flow KMOL/H | 43337 | 23921 | 23921 | 7385 | 24262 | 54943 | 54943 | 36729 | 18214 | 18214 | 54943 | 54943 | 54943 | 43337 |
| Temperature °C. | 240 | 250 | 25 | 300 | 1305 | 500 | 313 | 313 | 313 | 443 | 357 | 174 | 40 | 40 |
| Pressure BAR | 32 | 34 | 34 | 34 | 34 | 32 | 32 | 32 | 32 | 32 | 32 | 32 | 32 | 32 |
| Pressure MPa | 3.4 | 3.4 | 3.4 | 3.4 | 3.4 | 3.2 | 3.2 | 3.2 | 3.2 | 3.2 | 3.2 | 3.2 | 3.2 | 3.2 |
| Vapor Fraction | 1 | 1 | 1 | 1 | 1 | 1 | 1 | 1 | 1 | 1 | 1 | 1 | 1 | 1 |
| Enthalpy J/KMOL | −8.27E+07 | −8.27E+07 | −8.27E+07 | −6.90E+07 | −1.94E+07 | −1.19E+08 | −1.25E+08 | −1.25E+08 | −1.25E+08 | −1.25E+08 | −1.25E+08 | −1.31E+08 | −1.45E+08 | −1.07E+08 |
| Average MW | 18.94 | 18.94 | 18.94 | 18.94 | 12.63 | 17.55 | 17.55 | 17.55 | 17.55 | 17.55 | 17.55 | 17.55 | 17.55 | 17.41 |

| Mole Fraction | 15 | 16 | 17 | 18 | 19 | 20 | 21 | 22 | 23 | 24 | 25 | 26 | 27 | 28 |
|---|---|---|---|---|---|---|---|---|---|---|---|---|---|---|
| Oxygen | 0.00% | 0.00% | 0.00% | 0.00% | 0.00% | 0.00% | 0.00% | 0.00% | 0.00% | 0.00% | 0.00% | 0.00% | 0.00% | 99.50% |
| Methane | 0.49% | 2.93% | 2.83% | 0.05% | 0.80% | 0.00% | 5.13% | 5.13% | 5.13% | 5.13% | 12.38% | 12.38% | 6.35% | 0.00% |
| Carbon monoxide | 24.68% | 3.58% | 3.58% | 0.02% | 0.31% | 0.00% | 6.30% | 6.30% | 6.30% | 6.30% | 5.73% | 5.73% | 2.94% | 0.00% |
| Hydrogen | 52.83% | 10.07% | 10.07% | 0.03% | 0.41% | 0.01% | 17.76% | 17.76% | 17.76% | 17.76% | 16.17% | 16.17% | 8.29% | 0.00% |
| Carbon Dioxide | 20.13% | 37.02% | 37.02% | 1.31% | 13.16% | 0.49% | 64.34% | 64.34% | 64.34% | 64.34% | 58.72% | 58.72% | 30.10% | 0.00% |
| Water | 0.27% | 40.52% | 40.52% | 93.05% | 0.23% | 99.50% | 0.33% | 0.33% | 0.33% | 0.33% | 0.30% | 0.30% | 48.90% | 0.00% |
| Argon | 0.00% | 0.00% | 0.00% | 0.00% | 79.79% | 0.00% | 0.00% | 0.00% | 0.00% | 0.00% | 0.00% | 0.00% | 0.00% | 0.00% |
| FT Liquid | 0.00% | 2.25% | 2.25% | 5.18% | 0.22% | 0.00% | 0.32% | 0.32% | 0.32% | 0.32% | 1.01% | 1.01% | 0.52% | 0.00% |
| Ethane | 0.00% | 0.19% | 0.19% | 0.04% | 0.59% | 0.00% | 0.30% | 0.30% | 0.30% | 0.30% | 0.51% | 0.51% | 0.26% | 0.00% |
| Propane | 0.00% | 0.19% | 0.19% | 0.09% | 1.43% | 0.00% | 0.25% | 0.25% | 0.25% | 0.25% | 0.28% | 0.28% | 0.14% | 0.00% |
| Butane | 0.00% | 0.18% | 0.18% | 0.18% | 2.84% | 0.00% | 0.18% | 0.18% | 0.18% | 0.18% | 0.18% | 0.18% | 0.09% | 0.00% |
| Pentane | 0.00% | 0.18% | 0.18% | 0.00% | 0.00% | 0.00% | 0.00% | 0.00% | 0.00% | 0.00% | 0.03% | 0.03% | 0.01% | 0.00% |
| Isobutane | 0.00% | 0.00% | 0.00% | 0.00% | 0.00% | 0.00% | 0.18% | 0.18% | 0.18% | 0.18% | 0.01% | 0.01% | 0.00% | 0.00% |
| 2-Methyl-Butane | 0.00% | 0.00% | 0.00% | 0.00% | 0.00% | 0.00% | 0.00% | 0.00% | 0.00% | 0.00% | 0.00% | 0.00% | 0.00% | 0.00% |
| Hexane | 0.00% | 0.00% | 0.00% | 0.00% | 0.00% | 0.00% | 0.00% | 0.00% | 0.00% | 0.00% | 0.00% | 0.00% | 0.00% | 0.00% |
| Heptane | 0.00% | 0.02% | 0.00% | 0.02% | 0.23% | 0.00% | 0.00% | 0.00% | 0.00% | 0.00% | 0.00% | 0.00% | 0.00% | 0.00% |
| Nitrogen | 1.60% | 2.89% | 2.89% | 0.00% | 0.00% | 0.00% | 5.09% | 5.09% | 5.09% | 5.09% | 4.68% | 4.68% | 2.40% | 0.50% |
| Total Flow KMOL/H | 43337 | 23921 | 23921 | 10368 | 674 | 9694 | 13553 | 1355 | 12198 | 12198 | 13398 | 13398 | 26138 | 5212 |
| Temperature °C. | 240 | 250 | 40 | 40 | 42 | 42 | 40 | 40 | 40 | 52 | 49 | 430 | 426 | 25 |
| Pressure BAR | 32 | 28 | 28 | 28 | 28 | 28 | 28 | 28 | 28 | 32 | 32 | 32 | 32 | 34 |

TABLE 1-continued

Heat and Material Balance for FT production example under iso-conditions

| | 29 | 30 | 31 | 32 | 33 | 34 | 35 | 36 | 37 | 38 | 39 | 40 | 41 | 42 |
|---|---|---|---|---|---|---|---|---|---|---|---|---|---|---|
| Pressure MPa | 3.2 | 2.8 | 2.8 | 2.8 | 2.8 | 2.8 | 2.8 | 2.8 | 2.8 | 3.2 | 3.2 | 3.2 | 3.2 | 3.4 |
| Vapor Fraction | 1 | 1 | 1 | 0 | 0 | 0 | 1 | 1 | 1 | 1 | 1 | 1 | 1 | 1 |
| Enthalpy J/KMOL | −1.01E+08 | −2.49E+08 | −2.78E+08 | −2.94E+08 | −4.19E+08 | −2.85E+08 | −2.66E+08 | −2.66E+08 | −2.66E+08 | −2.66E+08 | −2.49E+08 | −2.33E+08 | −2.31E+08 | −2.99E+05 |
| Average MW | 17.41 | 31.54 | 31.54 | 29.31 | 190.01 | 18.14 | 33.25 | 33.25 | 33.25 | 33.25 | 31.97 | 31.97 | 25 | 31.98 |

| Mole Fraction | 29 | 30 | 31 | 32 | 33 | 34 | 35 | 36 | 37 | 38 | 39 | 40 | 41 | 42 |
|---|---|---|---|---|---|---|---|---|---|---|---|---|---|---|
| Oxygen | 99.50% | 0.00% | 0.00% | 0.00% | 0.00% | 0.00% | 0.00% | 0.00% | 0.00% | 0.00% | 0.00% | 0.00% | 0.00% | 0.00% |
| Methane | 0.00% | 0.00% | 0.00% | 0.00% | 0.00% | 0.00% | 0.00% | 0.00% | 0.00% | 0.00% | 0.00% | 0.00% | 86.08% | 86.08% |
| Carbon monoxide | 0.00% | 0.00% | 0.00% | 0.00% | 0.00% | 0.00% | 0.00% | 0.00% | 0.00% | 0.00% | 0.00% | 0.00% | 0.00% | 0.00% |
| Hydrogen | 0.00% | 0.00% | 0.00% | 0.00% | 0.00% | 0.00% | 0.00% | 0.00% | 0.00% | 0.00% | 0.00% | 0.00% | 0.00% | 0.00% |
| Carbon Dioxide | 0.00% | 0.00% | 0.00% | 0.00% | 0.00% | 0.00% | 0.00% | 0.00% | 0.00% | 0.00% | 0.00% | 0.00% | 1.61% | 1.61% |
| Water | 0.00% | 100.00% | 100.00% | 100.00% | 100.00% | 100.00% | 100.00% | 100.00% | 100.00% | 100.00% | 100.00% | 100.00% | 0.00% | 0.00% |
| Argon | 0.00% | 0.00% | 0.00% | 0.00% | 0.00% | 0.00% | 0.00% | 0.00% | 0.00% | 0.00% | 0.00% | 0.00% | 0.00% | 0.00% |
| FT Liquid | 0.00% | 0.00% | 0.00% | 0.00% | 0.00% | 0.00% | 0.00% | 0.00% | 0.00% | 0.00% | 0.00% | 0.00% | 0.00% | 0.00% |
| Ethane | 0.00% | 0.00% | 0.00% | 0.00% | 0.00% | 0.00% | 0.00% | 0.00% | 0.00% | 0.00% | 0.00% | 0.00% | 8.02% | 8.02% |
| Propane | 0.00% | 0.00% | 0.00% | 0.00% | 0.00% | 0.00% | 0.00% | 0.00% | 0.00% | 0.00% | 0.00% | 0.00% | 2.66% | 2.66% |
| Butane | 0.00% | 0.00% | 0.00% | 0.00% | 0.00% | 0.00% | 0.00% | 0.00% | 0.00% | 0.00% | 0.00% | 0.00% | 0.57% | 0.57% |
| Pentane | 0.00% | 0.00% | 0.00% | 0.00% | 0.00% | 0.00% | 0.00% | 0.00% | 0.00% | 0.00% | 0.00% | 0.00% | 0.09% | 0.09% |
| Isobutane | 0.00% | 0.00% | 0.00% | 0.00% | 0.00% | 0.00% | 0.00% | 0.00% | 0.00% | 0.00% | 0.00% | 0.00% | 0.29% | 0.29% |
| 2-Methyl-Butane | 0.00% | 0.00% | 0.00% | 0.00% | 0.00% | 0.00% | 0.00% | 0.00% | 0.00% | 0.00% | 0.00% | 0.00% | 0.10% | 0.10% |
| Hexane | 0.00% | 0.00% | 0.00% | 0.00% | 0.00% | 0.00% | 0.00% | 0.00% | 0.00% | 0.00% | 0.00% | 0.00% | 0.05% | 0.05% |
| Heptane | 0.00% | 0.00% | 0.00% | 0.00% | 0.00% | 0.00% | 0.00% | 0.00% | 0.00% | 0.00% | 0.00% | 0.00% | 0.01% | 0.01% |
| Nitrogen | 0.50% | 0.00% | 0.00% | 0.00% | 0.00% | 0.00% | 0.00% | 0.00% | 0.00% | 0.00% | 0.00% | 0.00% | 0.52% | 0.52% |
| Total Flow KMOL/H | 5212 | 4545 | 2572 | 9432 | 2572 | 4545 | 11405 | 3309 | 1236 | 304 | 932 | 932 | 943 | 943 |
| Temperature °C | 270 | 25 | 430 | 25 | 100 | 340 | 430 | 430 | 430 | 430 | 430 | 210.45 | 25 | 450 |
| Pressure BAR | 34 | 35 | 35 | 35 | 35 | 35 | 35 | 35 | 35 | 35 | 35 | 35 | 22.4 | 22.4 |
| Pressure MPa | 3.4 | 3.5 | 3.5 | 3.5 | 3.5 | 3.5 | 3.5 | 3.5 | 3.5 | 3.5 | 3.5 | 3.5 | 2.24 | 2.24 |
| Vapor Fraction | 1 | 0 | 1 | 0 | 0 | 1 | 1 | 1 | 1 | 1 | 1 | 0 | 1 | 1 |
| Enthalpy J/KMOL | 7.38E+06 | −2.86E+08 | −2.29E+08 | −2.86E+08 | −2.80E+08 | −2.32E+08 | −2.29E+08 | −2.29E+08 | −2.29E+08 | −2.29E+08 | −2.29E+08 | −2.72E+08 | −8.24E+07 | −5.96E+07 |
| Average MW | 31.98 | 18.02 | 18.02 | 18.02 | 18.02 | 18.02 | 18.02 | 18.02 | 18.02 | 18.02 | 18.02 | 18.02 | 18.94 | 18.94 |

| Mole Fraction | 43 | 44 | 45 | 46 | 47 | 48 | 49 | 50 | 51 | 52 |
|---|---|---|---|---|---|---|---|---|---|---|
| Oxygen | 1.00% | 1.00% | 21.50% | 21.50% | 11.94% | 12.77% | 12.77% | 0.00% | 21.50% | 0.00% |
| Methane | 0.00% | 0.00% | 0.00% | 0.00% | 0.00% | 0.00% | 0.00% | 0.00% | 0.00% | 0.00% |
| Carbon monoxide | 0.00% | 0.00% | 0.00% | 0.00% | 0.00% | 0.00% | 0.00% | 0.01% | 0.00% | 0.01% |
| Hydrogen | 0.00% | 0.00% | 0.00% | 0.00% | 0.00% | 0.00% | 0.00% | 0.02% | 0.00% | 0.02% |
| Carbon Dioxide | 0.00% | 0.00% | 0.00% | 0.00% | 3.41% | 3.11% | 3.11% | 0.26% | 0.00% | 0.26% |
| Water | 0.00% | 0.00% | 1.50% | 1.50% | 7.50% | 6.98% | 6.98% | 99.70% | 1.50% | 99.70% |
| Argon | 0.00% | 0.00% | 1.00% | 1.00% | 0.85% | 0.86% | 0.86% | 0.00% | 1.00% | 0.00% |
| FT Liquid | 0.00% | 0.00% | 0.00% | 0.00% | 0.00% | 0.00% | 0.00% | 0.00% | 0.00% | 0.00% |
| Ethane | 0.00% | 0.00% | 0.00% | 0.00% | 0.00% | 0.00% | 0.00% | 0.00% | 0.00% | 0.00% |
| Propane | 0.00% | 0.00% | 0.00% | 0.00% | 0.00% | 0.00% | 0.00% | 0.00% | 0.00% | 0.00% |
| Butane | 0.00% | 0.00% | 0.00% | 0.00% | 0.00% | 0.00% | 0.00% | 0.00% | 0.00% | 0.00% |
| Pentane | 0.00% | 0.00% | 0.00% | 0.00% | 0.00% | 0.00% | 0.00% | 0.00% | 0.00% | 0.00% |
| Isobutane | 0.00% | 0.00% | 0.00% | 0.00% | 0.00% | 0.00% | 0.00% | 0.00% | 0.00% | 0.00% |
| 2-Methyl-Butane | 0.00% | 0.00% | 0.00% | 0.00% | 0.00% | 0.00% | 0.00% | 0.00% | 0.00% | 0.00% |
| Hexane | 0.00% | 0.00% | 0.00% | 0.00% | 0.00% | 0.00% | 0.00% | 0.00% | 0.00% | 0.00% |
| Heptane | 0.00% | 0.00% | 0.00% | 0.00% | 0.00% | 0.00% | 0.00% | 0.00% | 0.00% | 0.00% |

TABLE 1-continued

Heat and Material Balance for FT production example under iso-conditions

| Nitrogen | 99.00% | 99.00% | 76.00% | 76.00% | 76.30% | 76.28% | 76.28% | 0.00% | 76.00% | 0.00% |
|---|---|---|---|---|---|---|---|---|---|---|
| Total Flow KMOL/H | 3784 | 3784 | 30465 | 27419 | 32225 | 35272 | 35272 | 11606 | 3047 | 11606 |
| Temperature ° C. | 25 | 450 | 25 | 360 | 1133 | 549 | 100 | 40 | 360 | 40 |
| Pressure BAR | 22.4 | 22.4 | 1.01 | 11.95 | 11.47 | 1.05 | 1.05 | 32 | 12 | 32 |
| Pressure MPa | 2.2 | 2.2 | 0.1 | 1.2 | 1.1 | 0.1 | 0.1 | 3.2 | 1.2 | 3.2 |
| Vapor Fraction | 1 | 1 | 1 | 1 | 1 | 1 | 1 | 0 | 0 | 0 |
| Enthalpy J/KMOL | −1.56E+05 | 1.27E+07 | −3.64E+06 | 6.35E+06 | 5.13E+06 | −1.29E+07 | −2.69E+07 | −2.85E+08 | 6.35E+06 | −2.85E+08 |
| Average MW | 28.05 | 28.05 | 28.84 | 28.84 | 28.39 | 28.43 | 28.43 | 18.08 | 28.84 | 18.08 |

Note - based on iso-conditions for the gas turbine

The exemplified embodiment of the present invention is compared with the Natural Gas Fischer-Tropsch Technology report carried out by Bechtel Ltd for the U.S. DOE Pittsburgh Energy Technology Center (Reference—U.S. Department of Energy Pittsburgh Energy Technology Center—Baseline Design/Economics for advanced Fischer Tropsch Technology Contract No. DE-AC22-91PC90027. Tropical Report VI—Natural Gas Fischer Tropsch Case Volume II Plant Design and Aspen Process Simulation Model—by Bechtel Ltd August 1996.)

|  |  | Basis | Invention | Saving |
|---|---|---|---|---|
| Synthesis gas production | kmol/h | 59860 | 59860 |  |
| Natural gas used | MMSCFD ($Nm^3/h$) | 411.9 ($4.51 \times 10^5$) | 396 ($4.33 \times 10^5$) | 4% |
| $O_2$ used (99.5% purity) | MTD (Kg/h) | 11391 ($4.75 \times 10^5$) | 6791 ($2.83 \times 10^5$) | 40% |
| FT Gasoline produced | Bbl/day ($m^3/h$) | 17030 (112.8) | 17030 (112.8) |  |
| FT Diesel produced | Bbl/day ($m^3/h$) | 26210 (173.6) | 26210 (173.6) |  |
| Propane produced | Bbl/day ($m^3/h$) | 1700 (11.3) | 1700 (11.3) |  |
| Thermal Efficiency (LHV - Lower Heating Value) | % | 56.94% | 58.57% |  |

The invention figures are based on non-iso conditions for the gas turbine performance. The Fischer Tropsch synthesis has been scaled from the basis case to give consistent results. The same natural gas composition was also used to ensure the energy balances were also consistent. Further, the computer simulation of the invention process incorporates a carbon dioxide recycle to the GHR (in order to make more hydrogen to balance the process) solely for comparative purposes. This recycle step actually reduces the efficiency of the present invention.

In another embodiment of the present invention, a synthesis gas stream with a hydrogen to carbon monoxide ratio of about 2:1 and a carbon dioxide composition of about 5% is required for an F-T plant. The F-T synthesis produces pure carbon dioxide and fuel gas as a by-product. For this flowsheet, the carbon dioxide is fed to the GHR as part of the feed to achieve the required 2:1 hydrogen to carbon monoxide ratio in the synthesis gas stream. The fuel gas has a high enough calorific value to be used instead of natural gas in the gas turbine. The steam to carbon ratio required is about 2.2:1 for this case so the excess steam produced in the HRSG is added to the fuel for the gas turbine. This conditions the fuel in the gas turbine and will help to reduce the $NO_x$ emissions from turbine. The other significant change is that there is no longer any need to shift carbon monoxide to hydrogen so the shift reactor is omitted from the flowsheet.

It will be appreciated that the invention is not restricted to the details described above with reference to the preferred embodiments but that numerous modifications and variations can be made without departing from the scope of the invention as defined in the following claims.

What is claimed is:

1. A process for the production of synthesis gas, said process comprising:
    reacting hydrocarbon fuel gas with steam and/or oxygen gas in a synthesis gas generation system to produce a synthesis gas product stream;
    compressing an oxidant gas to produce a compressed oxidant gas;
    combusting combustion fuel gas in the presence of at least a portion of said compressed oxidant gas to produce combustion product gas;
    expanding said combustion product gas to produce power and expanded combustion product gas;
    heating a first steam stream by heat exchange against a stream of said expanded combustion product gas to produce a heated first steam stream and using at least a portion of said heated first steam stream to provide at least a portion of the steam for producing the synthesis gas product stream in the synthesis gas generation system; and
    providing at least a portion of the oxygen gas using an air separation unit ("ASU") that is driven by at least a portion of the power generated by the expansion of the combustion product gas.

2. The process according to claim 1 wherein the synthesis gas generation system comprises a gas heated reformer ("GHR"), said process further comprising reforming hydrocarbon fuel gas with steam to produce synthesis gas.

3. The process according to claim 1 wherein the synthesis gas generation system comprises a partial oxidation reactor ("POX") and a GHR in combination, said process further comprising:
    partially oxidizing hydrocarbon fuel gas in the presence of oxygen gas in the POX to produce a first intermediate synthesis gas product; and
    reforming hydrocarbon fuel gas with steam in the GHR to produce a second intermediate synthesis gas product and combining said intermediate synthesis gas products to produce the synthesis gas product stream.

4. The process according to claim 1 wherein the synthesis gas generation system comprises an autothermal reformer ("ATR").

5. The process according to claim 1 further comprising:
    heating water by heat exchange against the expanded combustion product gas stream to produce a heated second steam stream;
    heating an oxygen gas stream by heat exchange against the heated second steam stream to produce a heated oxygen gas stream; and
    using said heated oxygen gas stream to provide at least a portion of the oxygen gas in the synthesis gas generation system.

6. The process according to claim 5 wherein the heated second steam stream is a portion of the heated first steam stream.

7. The process according to claim 1 further comprising:
    heating water by heat exchange against the expanded combustion product gas stream to produce a heated third steam stream; and
    introducing the heated third steam stream into the combustion of the combustion fuel gas.

8. The process according to claim 7 wherein the heated third steam stream is an excess portion of the heated first steam stream.

9. The process according to claim 1 wherein the hydrocarbon fuel gas is selected from the group consisting of methane, natural gas, gas associated with oil production and combustible off-gases from downstream processes and the combustion fuel gas is selected from the group consisting of hydrogen, methane, natural gas, gas associated with oil production and combustible off-gases from downstream processes.

10. The process according to claim 1 wherein the combustion fuel gas comprises substantially pure hydrogen produced from the synthesis gas product stream.

11. The process according to claim 1 further comprising:
heating a compressed nitrogen stream by heat exchange against the expanded combustion product gas stream to provide a heated compressed nitrogen stream; and
introducing said heated compressed nitrogen stream into the combustion of the combustion fuel gas.

12. The process according to claim 11 further comprising producing said compressed nitrogen stream by compressing a stream of nitrogen produced in an ASU.

13. The process according to claim 1 further comprising processing the synthesis gas product stream or a stream derived therefrom in a synfuel generation system to produce a synfuel.

14. The process according to claim 13 wherein the synfuel generation system comprises a Fischer-Tropsch ("F-T") reactor and the synfuel is a mixture of high molecular weight hydrocarbon compounds.

15. The process according to claim 14 wherein combustible off-gases are generated in the F-T reactor and at least a portion of said combustible off-gases are introduced into the combustion of the combustion fuel gas.

16. The process according to claim 14 wherein combustible off-gases are generated in the F-T reactor and a stream of at least a portion of said combustible off-gases or a stream derived therefrom is combined with hydrocarbon fuel gas to produce a combined gas stream, said combined gas stream or a stream derived therefrom being fed as fuel to the synthesis gas generation system.

17. The process according to claim 13 wherein the synfuel generation system comprises a reactor provided with a carbon monoxide hydrogenation catalyst and the synfuel is methanol.

18. The process according to claim 17 further comprising:
removing a purge gas stream comprising unreacted synthesis gas and inert gas from the reactor; and
introducing at least a portion of the purge gas stream or a stream derived therefrom as fuel into the combustion of the combustion fuel gas.

19. The process according to claim 17 further comprising:
removing a purge gas stream from the reactor;
combining the purge gas stream or a stream derived therefrom with hydrocarbon fuel gas to produce a combined purge gas stream; and
feeding at least a portion of the combined purge gas stream to the synthesis gas generation system.

* * * * *